United States Patent [19]

Miller

[11] Patent Number: 5,566,714
[45] Date of Patent: Oct. 22, 1996

[54] HYDRAULIC COUPLER

[75] Inventor: Douglas P. Miller, New Berlin, Wis.

[73] Assignee: Applied Power Inc., Butler, Wis.

[21] Appl. No.: 453,129

[22] Filed: May 24, 1995

[51] Int. Cl.$^6$ .................................................. F16L 37/28
[52] U.S. Cl. ...................................... 137/614.04; 137/614
[58] Field of Search ..................... 137/614.04, 614.02, 137/614; 251/149.6

[56] References Cited

U.S. PATENT DOCUMENTS

| | | |
|---|---|---|
| Re. 34,781 | 11/1994 | Spalink et al. . |
| 3,191,972 | 6/1965 | Collar ............................. 137/614.04 X |
| 3,525,361 | 8/1970 | Cerbin et al. ..................... 137/614.04 |
| 3,586,047 | 6/1971 | Ehrenberg ........................ 137/614.04 |
| 3,625,251 | 12/1971 | Nelson . |
| 3,646,964 | 3/1972 | Stratman . |
| 3,674,051 | 7/1972 | Stratman . |
| 3,695,139 | 10/1972 | Howe . |
| 3,758,137 | 9/1973 | Kershaw . |
| 3,791,411 | 2/1974 | Bogeskov et al. . |
| 3,809,122 | 5/1974 | Berg . |
| 3,831,984 | 8/1974 | Kutina et al. . |
| 4,009,729 | 3/1977 | Vik . |
| 4,060,219 | 11/1977 | Crawford . |
| 4,074,698 | 2/1978 | Hobson et al. . |
| 4,077,433 | 3/1978 | Maldavs . |
| 4,142,740 | 3/1979 | Wilms . |
| 4,150,691 | 4/1979 | Maldavs . |
| 4,192,347 | 3/1980 | Richard . |
| 4,211,252 | 7/1980 | Pezzini et al. . |
| 4,213,482 | 7/1980 | Gondek . |
| 4,214,840 | 7/1980 | Beales . |
| 4,221,235 | 9/1980 | Maldavs . |
| 4,260,184 | 4/1981 | Greenawalt et al. . |
| 4,398,561 | 8/1983 | Maldavs . |
| 4,444,223 | 4/1984 | Maldavs . |
| 4,485,845 | 12/1984 | Brady . |
| 4,522,430 | 6/1985 | Stromberg . |
| 4,522,433 | 6/1985 | Valentine et al. . |
| 4,538,679 | 9/1985 | Hoskins et al. . |
| 4,540,021 | 9/1985 | Rogers . |
| 4,565,211 | 1/1986 | Denney . |
| 4,565,392 | 1/1986 | Vyse . |
| 4,582,347 | 4/1986 | Wilcox et al. . |
| 4,583,711 | 4/1986 | Johnson . |
| 4,624,483 | 11/1986 | Stromberg . |
| 4,691,429 | 9/1987 | Goodsmith . |
| 4,763,951 | 8/1988 | Silverman . |
| 4,768,538 | 9/1988 | Mintz et al. . |
| 4,854,345 | 8/1989 | Badoureaux ............... 251/149.6 X |
| 4,886,301 | 12/1989 | Remsburg . |
| 4,915,351 | 4/1990 | Hoffman . |
| 5,005,877 | 4/1991 | Hayman . |
| 5,029,613 | 7/1991 | Smith, III . |
| 5,044,401 | 9/1991 | Giesler et al. . |
| 5,052,647 | 10/1991 | Axelson et al. . |

(List continued on next page.)

FOREIGN PATENT DOCUMENTS

| | | |
|---|---|---|
| 0086130 | 5/1988 | European Pat. Off. . |
| 0085010 | 7/1989 | European Pat. Off. . |
| 2246802 | 11/1976 | France . |
| 2554543 | 7/1986 | France . |
| 2143332C2 | 1/1985 | Germany . |
| 151175 | 2/1977 | Netherlands . |

OTHER PUBLICATIONS

Applicant's Exhibits A–G, undated, all of which are admitted prior art.

*Primary Examiner*—Kevin Lee
*Attorney, Agent, or Firm*—Quarles & Brady

[57] ABSTRACT

A hydraulic coupler has two halves connected together and identical bores in the halves which together promote laminar flow through the coupler. After entering the poppet in one half, flow through the coupler is directed to an enlarged flow section, through the central portion of the coupler to the enlarged flow section in the other half and then through crossbores in the poppet in the other half and out through that poppet. The flow section of each half is between a seating section and an outward section, and the seating section has a cylindrical portion with a diameter which is equal to the diameter of the outward section.

8 Claims, 1 Drawing Sheet

U.S. PATENT DOCUMENTS

| | | |
|---|---|---|
| 5,063,965 | 11/1991 | Wilcox . |
| 5,072,755 | 12/1991 | Wilcox . |
| 5,074,524 | 12/1991 | Wade . |
| 5,123,446 | 6/1992 | Haunhorst et al. . |
| 5,167,398 | 12/1992 | Wade et al. . |
| 5,284,183 | 2/1994 | Smith, III . |
| 5,294,092 | 3/1994 | Wade et al. . |
| 5,322,330 | 6/1994 | Remsburg . |
| 5,339,861 | 8/1994 | Smith, III . |
| 5,362,109 | 11/1994 | Pacht . |
| 5,370,153 | 12/1994 | Galle . |

5,566,714

HYDRAULIC COUPLER

FIELD OF THE INVENTION

This invention relates to automatic shutoff hydraulic couplers of the type which are used to connect a pressurizable supply line to a hydraulic device or to another supply line.

DISCUSSION OF THE PRIOR ART

Hydraulic couplers are known having two halves, secured together by a threaded connection, with one half secured to the hydraulic line or hydraulic device and the other half secured to the hydraulic line or device which it is desired to make the connection with. When the two halves are released from each other, a ball or poppet in each half prevents flow out of the hydraulic line or device to which the half is connected. When the halves are put together, the poppets or balls push one another out of the way so as to open a flow passage through the coupler when the two halves are fully assembled together.

Balls have been used in many of these couplers as the closure elements to block flow when the halves are released from one another. However, because of the shape of the ball, the flow area available even when the ball is open is relatively small, especially for smaller couplers. Also, because the ball must extend past the end of the half when the ball is shut, so that it can abut the other balls so as to open the flow path, the section of metal of the half holding the ball in the half must be relatively small. As a result, with high pressures, that section of metal can give way, resulting in a failed coupler. Thus, to achieve acceptable flow rates and secure holding and sealing against the ball, ball type couplers have been made relatively large. Consequently, since they protrude relatively far out from the device to which they are connected, they are susceptible to being bumped or hit and therefore damaged.

Couplers are also known having barrel shaped poppets with stems extending from the inner ends of the poppets beyond the half, so as to abut the stem of the other poppet and open the flow path through the coupler. These have usually consisted of many parts, including complex arrangements for retaining a spring in each half to bias the poppet shut. Attempts have also been made which provided serpentine flow paths through the coupler, which restricted flow rates through the coupler and also resulted in inconsistent flow characteristics.

SUMMARY OF THE INVENTION

The invention provides a hydraulic coupler of the poppet type which overcomes the above disadvantages. In a coupler of the invention, the bore in each half has an inward section adjacent to the stem of the poppet, an outward section for slidably receiving the barrel section of the poppet, a seating section for seating against the poppet and a flow section adjacent to the crossbores in the poppet. The seating and flow sections are between the inward and outward sections and the flow section is between the seating and outward sections and of a diameter greater than the diameter of the outward section. Cross-bores through the poppet extend through the barrel section and open into the enlarged flow section. This helps provide laminar, consistent flow characteristics through the coupler and helps make the coupler relatively short and compact.

In another beneficial aspect, the seating section has a cylindrical portion with a diameter which is equal to the diameter of the outward section. This can be accurately provided with the same axis as the outward section by drilling it out with the same tool in the same drilling operation, for good guidance and seating of the poppet in the bore.

As a further benefit, an o-ring may be provided on the barrel section which seats against the cylindrical portion of the seating section in the closed position of the poppet to provide good low pressure seating. In addition, the seating section and poppet may be provided with frusto-conical transition portions between the cylindrical portion and the inward section which seat against one another to provide a fluid tight high pressure seal.

In another aspect, the crossbores open into the outward end of the flow section to further help straighten the flow path through the central portion of the coupler. In addition, a frusto-conical surface is formed at the outward end to help direct flow into and out of the crossbores.

Also, flow is coaxial with the springs which bias the poppets for the length of the springs, to provide for relatively unrestricted flow.

These and other objects and advantages of the invention will be apparent from the drawings and from the detailed description.

DETAILED DESCRITPION OF THE PREFERRED EMBODIMENTS

Figure 1:
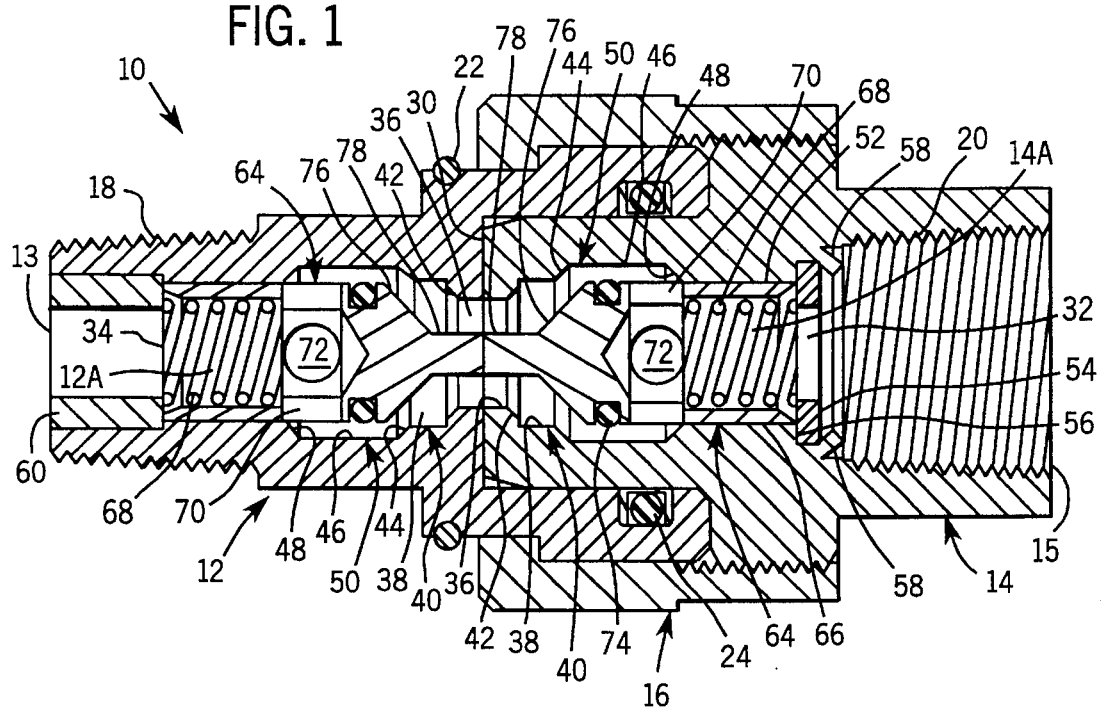
FIG. 1 is a longitudinal sectional view of a coupler of the invention.
Figure 2:
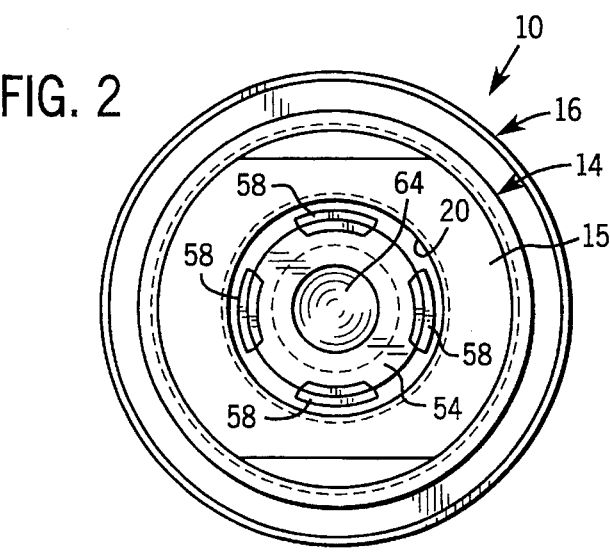
FIG. 2 is a right-end plan view of the coupler of FIG. 1.

FIG. 1 illustrates a coupler 10 of the invention which includes a first coupling half 12, a second coupling half 14 and a coupling nut 16. Half 12 has a male end 13 provided with threads 18 and half 14 has a female end 15 provided with internal threads 20. The coupler 10 may be connected between hydraulic devices, conduits or hoses so as to communicate hydraulic fluid between the ends 13 and 15.

Nut 16 has internal threads which engage external threads of half 14 to hold the halves 18 and 14 together. A retaining clip 22 is secured on half 12 to prevent nut 16 from sliding off of the half 12 when it is unscrewed from the half 14. A seal 24 provides a fluid tight seal between half 12 and half 14.

The half 14 defines within it a bore 14A and the half 12 defines within it a bore 12A. The bores 14A and 12A are identical mirror images of one another from the parting line 30 between the two halves out to the respective outer ends 32 and 34. The bores 14A and 12A are coaxial and together define a flow passageway through the coupler 10. Since the bores 14A and 12A are identical, except at the outer ends, only the bore 14A will be described specifically, it being understood that the description also applies to the bore 12A.

Adjacent to parting line 30, bore 14A has an inward section 36 which is cylindrical in shape and of a smaller diameter than cylindrical portion 38 of seating section 40, which also includes frusto-conical section 42. Outward from the seating section 40, a frusto-conical surface 44, a cylindrical surface 46 and another frusto-conical surface 48 (although frusto-conically tapering in the opposite direction from surface 44) define a flow section 50 of the bore 14A.

Crossbores 70 and 72 open into the outward end of flow section 50 and surface 48 is frusto-conically tapered so as to direct flow into the cross-bores 70 and 72 if flow is away from the other half) or out of the cross-bores 70 and 72 (if flow is toward the other half). Still further out from the flow section 50, bore 14A has an outward section 52 which is cylindrical in shape and of a diameter smaller than cylindrical portion 46 of flow section 50. The diameter of outward section 52 is preferably of the same diameter as section 38 so that both sections 38 and 52 can be drilled out in the same operation, so as to assure them being co-axial to facilitate sliding of the poppet 64 within them.

At the outer end 32 of bore 14A, an annular retainer 54 abuts annular shoulder 56 and is held in place by the half 14 being staked at 58, to provide a spring stop. In the bore 12A, a spring stop is provided at outer end 34 by a tubular bushing 60 which is held at the outer end of the bore 12A by it being pressed or crimped in an enlarged diameter at the end 34 of bore 12A.

Identical poppets 64 are received in the bores 14A and 12A and therefore only one of the poppets 64 will be described in detail. Each poppet 64 has a tubular barrel section 66 which is slidably received in the outward section 52 of each bore 14A and 12A. The barrel section 66 has an enlarged inside diameter which creates an axially facing shoulder at the inward end of barrel section 66 against which a spring 68 abuts. The other end of the spring 68 abuts the retainer 54 in the half 14 and abuts the bushing 60 in the half 12. When the poppets are fully open as shown in FIG. 1, barrel section 66 may abut the respective washer 54 or bushing 60.

Toward the inward end of the barrel section 66, a pair of crossbores 70 and 72 extend through the barrel section 66 at right angles to one another to provide fluid communication from inside the barrel 66 to outside of the barrel 66, and in the reverse direction. Inward of the crossbores 70 and 72, an o-ring 74 is provided in a groove around the barrel section 66 at the inward end of the barrel section 66. Inward of the barrel section 66, a frusto-conical transition section 76 tapers at approximately the same angle as frusto-conical section 42 of the bore 14A (or 12A). Inward of the transition section 76, a stem 78 of a significantly smaller diameter than the barrel section 66 extends which abuts the end of the stem 78 of the other poppet 64 in the opposing half.

When the halves 14 and 18 are released from one another, the spring 68 biases each poppet 64 inwardly so as to seat surface 76 against surface 42 and seat o-ring 74 against surface 38. Thus, the o-ring 74 provides a low pressure seal and the metal-to-metal contact of the surface 76 to the surface 42 provides a high pressure seal.

When the halves 14 and 18 are connected as shown in FIG. 1, the stems 78 of the two poppets 64 abut one another and as the half 14 is drawn closer to the half 12 by turning nut 16, the poppets 64 are ultimately moved to the positions shown in FIG. 1, in which they are fully open. Flow in either direction therefore passes from one end, for example end 15, through washer 54 and barrel section 66, coaxial with spring 68, through crossbores 70 and 72 into flow section 50, past surface 44, 38, 42 and 36 of each half 14 and 18, through crossbores 70 and 72 in the downstream poppet, and out through barrel 66 and bushing 60. Flow from end 18 to end 20 is in the reverse direction.

The sum total area of the crossbores 70 and 72 is relatively large so that flow is largely unrestricted by them. However, in prior couplers, the flow through the central portion of the coupler, in the area adjacent to the parting line 30 and out to the crossbores 70 and 72, has been restricted or inconsistent due to turbulence and small flow areas. The present design, with the enlarged flow section 50 and gradually stepped series of diameters between the crossbores 70 and 72 provides a more laminar flow through the center of the coupler and therefore less restriction and more consistent flow.

Many modifications and variations to the preferred embodiment described will be apparent to those skilled in the art. Therefore, the invention should not be limited to the embodiment described, but should be defined by the claims which follow.

I claim:

1. In a hydraulic coupler of the type having two halves releasably secured together with a poppet in each half slidable axially in a bore of said half in which when said halves are secured together said poppets abut one another to open a flow path which extends through said halves from one end of said coupler to the other and when said halves are released from each other each said poppet is biased to a closed position so as to close said flow path in each half, each said poppet having a hollow tubular barrel section at an outward end for axial flow through said poppet, a stem at an inward end of a smaller outside diameter than said barrel section and a transition section joining said barrel section and said stem, said stem extending beyond its corresponding half in said closed position to abut the stem of the other poppet when said halves are secured together, and crossbores through said poppet for communicating flow into or out of said barrel section, the improvement wherein each said bore has an inward section adjacent to said stem of said poppet, an outward section for slidably receiving said barrel section of said poppet, a seating section for seating against said poppet and a flow section adjacent to said crossbores in said poppet, said seating and flow sections being between said inward and outward sections and said flow section being between said seating and outward sections and of a diameter greater than the diameter of said outward section, said crossbores opening into said flow section and said seating section having a cylindrical portion with a diameter which is equal to the diameter of said outward section.

2. The improvement of claim 1, wherein an o-ring is provided on said barrel section which seats against said cylindrical portion of said seating section in said closed position of said poppet.

3. The improvement of claim 2, wherein said seating section includes a transition portion between said cylindrical portion and said inward section, and said transition section of said poppet seats against said transition portion of said bore.

4. The improvement of claim 3, wherein said transition section and said transition portion are frusto-conical.

5. The improvement of claim 1, wherein said crossbores open to an outward end of said flow section when said halves are connected.

6. The improvement of claim 5, wherein at least a portion of said outward end is frustoconically tapered so as to direct flow into or out of said crossbores.

7. In a hydraulic coupler of the type having two halves releasably secured together with a poppet in each half slidable axially in a bore of said half in which when said halves are secured together said poppets abut one another to open a flow path which extends through said halves from one end of said coupler to the other and when said halves are released from each other each said poppet is biased to a closed position so as to close said flow path in each half, each said poppet having a hollow tubular barrel section at an outward end, a stem at an inward end of a smaller outside diameter than said barrel section and a transition section joining said barrel section and said stem, said stem extending beyond its corresponding half in said closed position to abut the stem of the other poppet when said halves are secured together, and crossbores through said poppet, the improvement wherein each said bore has an inward section adjacent to said stem of said poppet, an outward section for slidably receiving said barrel section of said poppet, a seating section for seating against said poppet and a flow section adjacent to said crossbores in said poppet, said seating and flow sections being between said inward and outward sections and said flow section being between said seating and outward sections and of a diameter greater than the diameter of said outward section, said crossbores opening into said flow section when said halves are connected, a spring biasing said poppet to said closed position and a retainer in one of said halves abutting an end of said spring opposite from said poppet, said one of said halves being staked to fix said retainer in position.

8. The improvement of claim 7, further comprising a bushing crimped or press fit in the bore of one of said halves and abutting an end of a spring opposite from said poppet which biases said poppet to a closed position.

\* \* \* \* \*